(12) United States Patent
Bartling

(10) Patent No.: US 11,914,497 B2
(45) Date of Patent: Feb. 27, 2024

(54) PROFILING

(71) Applicant: Arm Limited, Cambridge (GB)

(72) Inventor: Michael Bartling, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/709,683

(22) Filed: Mar. 31, 2022

(65) Prior Publication Data

US 2023/0315609 A1    Oct. 5, 2023

(51) Int. Cl.
*G06F 11/36* (2006.01)
*G06F 9/455* (2018.01)
*G06F 11/34* (2006.01)

(52) U.S. Cl.
CPC ...... *G06F 11/3608* (2013.01); *G06F 9/45516* (2013.01); *G06F 11/3409* (2013.01); *G06F 11/3616* (2013.01)

(58) Field of Classification Search
CPC ............. G06F 11/3616; G06F 11/3409; G06F 11/3608; G06F 9/45516
USPC ........................................................ 717/126
See application file for complete search history.

(56) References Cited

U.S. PATENT DOCUMENTS

| | | | | |
|---|---|---|---|---|
| 8,966,453 | B1 * | 2/2015 | Zamfir | G06F 11/3604 717/124 |
| 10,902,121 | B2 | 1/2021 | Chari et al. | |
| 2004/0199904 | A1 * | 10/2004 | Schmidt | G06F 8/443 717/130 |
| 2010/0115494 | A1 | 5/2010 | Gorton, Jr. | |
| 2011/0219454 | A1 * | 9/2011 | Lee | G06F 21/577 707/706 |
| 2014/0032106 | A1 * | 1/2014 | Ginsberg | G01C 21/20 701/528 |
| 2016/0178377 | A1 * | 6/2016 | Jung | G01S 19/13 701/468 |
| 2017/0185400 | A1 * | 6/2017 | Shanbhogue | G06F 9/30145 |
| 2019/0108342 | A1 | 4/2019 | Conikee et al. | |
| 2020/0036895 | A1 * | 1/2020 | Midorikawa | G06T 7/215 |

OTHER PUBLICATIONS

Basu et al., "A Theoretical Study of Hardware Performance Counters-based Malware Detection", IEEE Transactions on Information Forensics and Security, Jun. 24, 2019, 14 pages.
Ball et al., "Efficient Path Profiling", Proceedings of the 29th annual ACM/IEEE international symposium on Microarchitecture, Dec. 2, 1996, pp. 46-57.
Unknown, "A procedure for sampling paths in a directed acyclic graph", Mathematics Stack Exchange, retrieved Feb. 9, 2022, 6 pages.
International Search Report and Written Opinion of the International Searching Authority for PCT/GB2022/053370 dated Mar. 24, 2023, 12 pages.

* cited by examiner

*Primary Examiner* — Chat C Do
*Assistant Examiner* — Bradford F Wheaton
(74) *Attorney, Agent, or Firm* — NIXON & VANDERHYE P.C.

(57) ABSTRACT

A data processing apparatus is provided that includes storage circuitry to store a plurality of interconnected instructions. Analysis circuitry analyses the instructions to determine a degree of uniqueness of profile measurements of a control flow path fragments within the instructions.

11 Claims, 7 Drawing Sheets

PROFILING

TECHNICAL FIELD

The present disclosure relates to data processing.

DESCRIPTION

Profiling can be used to identify a control flow path (e.g. a sequence of actions) that allows an attacker to take advantage of a vulnerability in computer software. For example, if a particular sequence of actions or control flow path was found to be vulnerable to attack, profiling can be performed to make particular measurements of that sequence of actions. Then, in the future, by performing profiling again and making the same measurements, it is possible to determine if an attack is taking place. One difficulty with this approach is that the measurements taken via profiling might not be unique to the vulnerable control flow path. In this situation, a completely legitimate control flow path might look like an attack. This is especially beneficial to an attacker, since it yields a large attack surface to work with. Indeed, the less unique each measure of control flow the more opportunity for an attacker to remain hidden, likewise the more unique each control flow is, the easier it becomes for an attack to be detected. In other words, for any possible attack that either diverts from the known structure of a program (executing code not present in the binary), or leverages existing structure of a program in sequence, it becomes increasingly difficult for an attacker to remain undetected. Further complicating detection is that profiling, in general, is resource intensive. It is therefore desirable to limit profiling where possible.

SUMMARY

Viewed from a first example configuration, there is provided a data processing apparatus comprising: storage circuitry configured to store a plurality of instructions, wherein the plurality of instructions are interconnected; and analysis circuitry configured to analyse the plurality of instructions to determine a degree of uniqueness of profile measurements of a plurality of control flow path fragments within the plurality of instructions.

Viewed from a second example configuration, there is provided a data processing method comprising: storing a plurality of instructions, wherein the plurality of instructions are interconnected; and analysing the plurality of instructions to determine a degree of uniqueness of profile measurements of a plurality of control flow path fragments within the plurality of instructions.

Viewed from a third example configuration, there is provided a non-transitory storage medium storing a computer program that, when executed: analyses a plurality of interconnected instructions to determine a degree of uniqueness of profile measurements of a plurality of control flow path fragments within the plurality of interconnected instructions.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
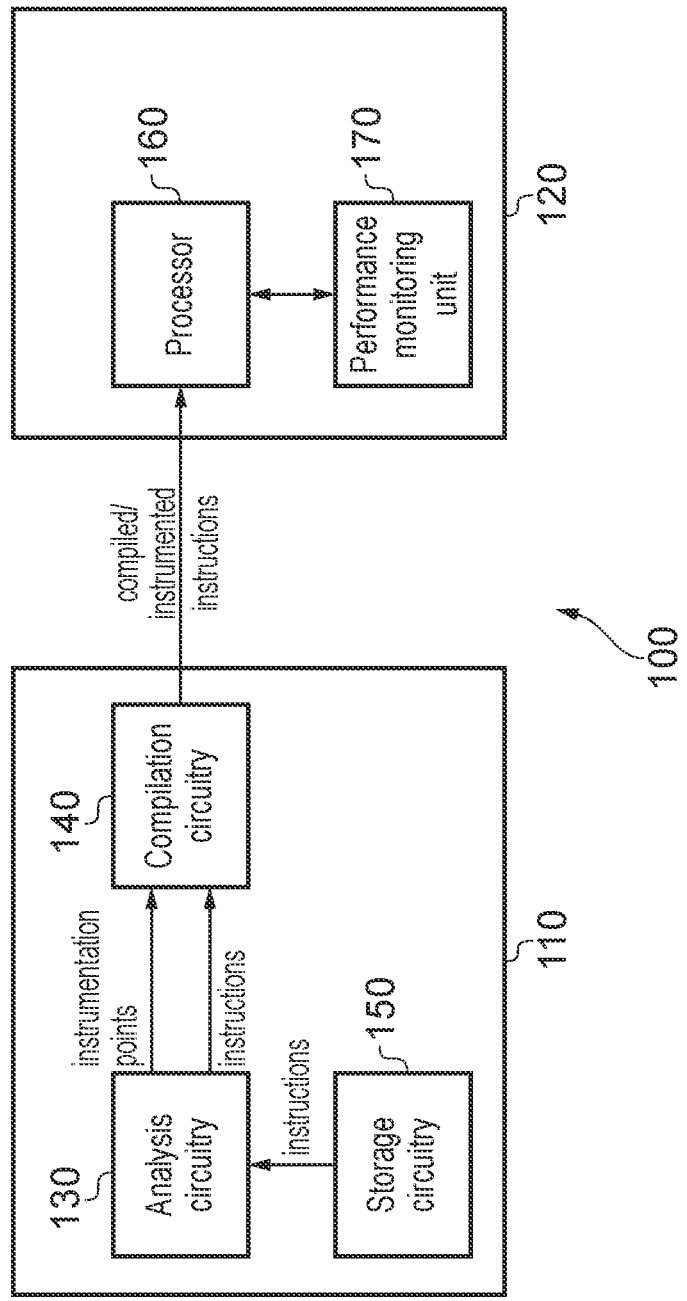
FIG. 1 illustrates a system comprising a data processing apparatus in accordance with some embodiments.

Before discussing the embodiments with reference to the accompanying figures, the following description of embodiments is provided.

In accordance with one example configuration there is provided a data processing apparatus comprising: storage circuitry configured to store a plurality of instructions, wherein the plurality of instructions are interconnected; and analysis circuitry configured to analyse the plurality of instructions to determine a degree of uniqueness of profile measurements of a plurality of control flow path fragments within the plurality of instructions.

The plurality of instructions could constitute a program or a part of a program such as a library or module. The instructions are interconnected with each other. In particular, this interconnection could be a consequence of the instructions having a particular order so that they are executed in a linear sequence and/or a consequence of explicit redirections that causes the flow to proceed in a non-linear manner. A plurality of control flow path fragments exist within the instructions. For instance, a control flow path fragment might represent a subset of the instructions following a theoretical flow through those instructions. These control flow path fragments need not start at the top basic block, nor do they need to end at the last basic block. They could instead represent a subset of an execution of the program. Profile measurements can be made that correspond with the control flow path fragments. These might, for instance, represent particular statistics or resource usages associated with the instructions that make up the control flow path fragment. The determination of these profile measurements does not necessitate execution of the control flow path fragment (although this might be the case in some situations). The analysis circuitry determines how unique the measurements are for some control flow path fragments. It is not necessary that all possible control flow path fragments are analysed and in some cases, only a subset of all possible control flow path fragments are considered. By determining the uniqueness of particular control flow path fragments, it is possible to more intelligently make decisions about how, where, and when profiling should take place so as to best catch behaviour that corresponds with an attack. For example, there may be little benefit to be had in performing profiling for a control flow path fragment that is executed as part of every single control flow path (an initialisation routine at the start of a program for instance), since this provides little to no information about which control flow path is being executed. The determination of the control flow path fragments can be made, for instance, with reference to a control flow graph.

In some examples, the degree of uniqueness of a given profile measurement is made with respect to a number of ways of producing the given profile measurement from different instruction combinations. If a control flow path fragment produces the given profile measurement, then the uniqueness represents how many other ways there are of producing that same profile measurement. For instance, if the profile measurement represents a resource usage, then the uniqueness is indicative of how many ways there are (of using different combinations of instructions) of producing that exact same resource usage. If the only way of producing the resource usage is the actual set of instructions associated with the control flow path fragment, then the profile measurement is unique. In other words, that exact control flow path fragment must be followed in order to obtain the profile measurement. If numerous other combinations of instructions will produce the same resource usage, then the profile measurement would have a comparably lower uniqueness.

In some examples, the plurality of instructions are divided into a plurality of basic blocks each comprising a contiguous subset of the plurality of instructions; and the plurality of basic blocks are interconnected using control flow instructions. Control flow instructions could be considered to be instructions that enable (but not necessarily force) the control flow away from a non-linear sequence. This might include (unconditional or conditional) branch instructions. Basic blocks can then be considered to be the instructions that are executed as a result of following a particular control flow instruction or alternatively, as all of the instructions between sequential control flow instructions. For instance, a function having no branch instructions could be considered to be a single basic block. If that function contains a single IF statement, then the function might be made up of three basic blocks—instructions preceding the IF statement, instructions to be executed if the IF statement applies and instructions to be executed if the IF statement does not apply. A fourth basic block could be made up of instructions to be executed once the IF statement has been resolved (or indeed, some of these blocks could be merged).

In some examples, each of the control flow path fragments is defined by a set of the control flow instructions. A fragment could therefore be a sequence of instructions (e.g. those in the basic blocks) that are joined together by a number of control flow instructions. The fragments retain the linearization of instructions previously mentioned. That is, the fragments are not entirely arbitrary sets of unrelated basic blocks.

In some examples, the profile measurements are measurements of a performance monitoring unit. A performance monitoring unit (PMU) is a device used for gathering various metrics on the operation of a processor and its memory system during runtime. PMU measurements can be estimated offline via static analysis of the code or code introspection.

In some examples, the profile measurements comprise one or more of: a number of executed instructions, a number of instructions, a number of control flow instructions taken, and a number of control flow instructions. The number of executed instructions could be the number of instructions that are executed within the control flow fragment, which might differ from the number of instructions that are actually within the control flow fragment (e.g. due to microarchitectural optimisations). The number of control flow instructions that are encountered might also differ from the number of control flow instructions that are taken (or not taken) since not all control flow instructions are taken—e.g. in the case of conditional branch instructions.

In some examples, the data processing apparatus comprises compilation circuitry configured to perform a compilation of the plurality of instructions to produce a compiled output, wherein the compiled output comprises instrumentation instructions to cause the profile measurements to be made when executed. A compilation process typically takes instructions provided in one language and translates those instructions into another 'language'. For instance, a compiler might translate instructions provided in C into machine code, for execution on a processor. In these examples, the compilation circuitry is also designed to insert instrumentation instructions. These are instructions that cause profile measurements to be made between a particular point or points in the remainder of the compiled code. Such profile measurements could be made using a PMU, for instance, as already described. In this way, the act of profiling (which can be resource intensive) can be limited.

In some examples, the compilation is a just-in-time compilation. In a just-in-time (JIT) compiler, at least some of the compilation occurs at execution time. This may be achieved by an initial (non JIT) compilation taking place to convert the initial source code into byte code that can be more easily converted into machine code at execution time. Where control flow path fragments are determined using a control flow graph, this could be obtained during a first or second stage of compilation, for instance.

In some examples, the analysis circuitry is configured to determine a profiling start point and a profiling end point based on the degree of uniqueness of the profile measurements of the plurality of control flow path fragments within the plurality of instructions. There are a number of ways in which the points at which profiling should be performed can be determined. However, in these examples, the uniqueness of the profile measurements is considered. For example, the points could be selected in order to maximise, optimise, or merely improve the uniqueness of the profile measurements as compared to other possible placements of the profile measurement instructions.

In some examples, the analysis circuitry is configured to determine the profiling start point and the profiling end point by determining a tradeoff between: a distance between the profiling start point and the profiling end point, and the degree of uniqueness of the profile measurements of the plurality of control flow path fragments within the plurality of instructions. The distance could be measured as a number of instructions (either overall instructions or instructions of a particular type). When the distance is measured in this way, the number of instructions could be considered as a minimum, maximum or average number of such instructions that could be encountered between the profiling start and end points (depending on the specific control flow path taken between the profiling start and end points). The distance could alternatively be measured as an amount of time or a number of processor cycles elapsed between the profiling start and end points. The tradeoff being experienced in these examples is that as the distance between the profiling start point and the profiling end point increases, the uniqueness of the measurement of each control flow path fragment increases—because more opportunity for deviation exists. However, the length of time for which profiling exists also increases, which can lead to increased resource usage. The goal of the tradeoff is therefore to select an acceptable point at which the distance is small and the degree of uniqueness is large. By having a large degree of uniqueness, it can be said with increased confidence whether a particular control flow path fragment is being executed or not based on the profile measurement. In some examples, an optimisation of the tradeoff may be determined. In other examples, the optimisation might be a statistical optimisation that indicates that the solution is particularly good but perhaps not the best.

In some examples, the control flow path fragments are selected by random sampling. In some of these examples, the random sampling is unbiased random sampling. For example, if control flow path fragments are selected that always begin at the start of the plurality of instructions, then a clear bias will be exist for the earlier instructions (rather than the later ones).

In some examples, the analysis circuitry has a restricted mode of operation in which at least one of the control flow path fragments cannot be reached by execution of the plurality of instructions; and the analysis circuitry has a full mode of operation in which the control flow path fragments are selected regardless of whether they can be reached during execution of the instructions. In the restricted mode of operation, therefore, at least one of the control flow path fragments cannot be reached by ordinary (linear) execution of the instructions. That is, if the instructions were actually to be executed, the flow of control could not pass along one of the control flow path fragments. This might occur, for instance, in the simplified example where the instructions express the code "IF (true) X else Y". In this situation, X will always execute because the IF statement will always be found to be true. During execution, it is not possible for the code Y to be reached via this IF statement. However, in a control flow graph, the graph could still represent this as a branch point; and the restricted mode of operation, in selecting the control flow path fragments, will allow such a control flow path fragment to be selected (even though it represents an impossible execution). This helps to reduce or eliminate bias in the control flow fragments. However, it also allows for the profiling of control flow paths that, although theoretically impossible, might be reached if a nefarious third party were to interfere with the execution of the instructions (e.g. as part of a buffer overflow attack). In the full mode of operation, the control flow path fragments may or may not include such situations.

Particular embodiments will now be described with reference to the figures.

FIG. 1 illustrates a system 100 comprising a data processing apparatus 110 in accordance with some embodiments. The data processing apparatus 110 includes storage circuitry 150 for storing a plurality of instructions. The instructions are such that they are interconnected. This could be as a result of their ordering within the plurality of instructions (i.e. such that the instructions are executed in a linear sequence) and/or a result of control flow instructions such as branch instructions. The instructions are considered by analysis circuitry 130. The analysis circuitry 130 acts to determine a set of instrumentation points within the instructions. The instrumentation points and the instructions can then be provided to the compilation circuitry 140. The compilation circuitry 140 produces a set of compiled/instrumented instructions.

The compiled/instrumented instructions can be provided to a second data processing apparatus 120 with a processor 160 that executes the compiled/instrumented instructions. A performance monitoring unit 170 (also sometimes referred to as a performance measurement unit) is provided to perform performance monitoring. In particular, the performance monitoring is enabled/disabled/updated by the instrumentation points within the compiled/instrumented instructions.

The performance monitoring unit 170 typically decreases the speed at which the processor 160 operates. Indeed, in some examples, the performance monitoring unit 170 could be the processor 160 itself and the performance monitoring could be performed by software executing on the processor. The compiled instructions could be executed, for instance, within a virtual machine executing on the processor 160 that is accessible to performance monitoring software running on the processor 160. In any event, the performance monitoring unit is set up to monitor, for instance, execution statistics and/or resource usage that is consumed during execution of the instructions while performance monitoring is enabled. In the examples that will be discussed in the remainder of this description, the two statistics that are monitored are the total number of instructions encountered and the number of branch instructions encountered.

It is desirable for the statistics provided by the performance monitoring unit 170 to be as unique as possible for each control flow path. In particular, if there is a one-to-one mapping between the statistics and the control flow paths, then by taking a set of measurements from the performance monitoring unit 170, it is possible to identify the control flow path being taken. This is particularly useful with respect to computer security. For example, if a particular control flow path is later found to be part of an attack vector in a computer system, then the performance monitoring statistics associated with that control flow path can be determined and used as a signature for detecting similar future attacks. If the performance monitoring statistics are unique with respect to the control flow paths, then this identification works very well. This uniqueness property gives credibility to the integrity of a program's baseline behaviours, and deviations from this baseline can be reasoned as abnormal. As the uniqueness improves, attacks become more difficult to hide since it is difficult for an attacker to find a legitimate control flow path that will produce the performance monitoring statistics that match an attack vector.

The instrumentation points are added to enable the performance monitoring to take place over a set of the instructions where uniqueness of the control flow paths is considered to be good.

The data processing apparatus 110 and the second data processing apparatus 120 could be the same device—for instance, if just-in-time compilation is being performed.

FIGS. 2A-2D illustrate a process of determining a degree of uniqueness of edges in a control flow graph. A control flow graph can be produced by considering a set of instructions (representing a program or a part of a program) as a series of interconnected basic blocks. A basic block is a set of contiguous instructions divided by control flow instructions (e.g. branch instructions). The control flow graph is therefore produced by representing basic blocks as vertices and edges as the control flow instructions (e.g. branches). Each basic block contains a number of instructions, which is indicated as the value of a vertex. The edges represent the possible locations (basic blocks) to which a control flow instruction can go from another basic block. A control flow graph can be derived by analysis of the code of a program, for instance.

Figure 2A:
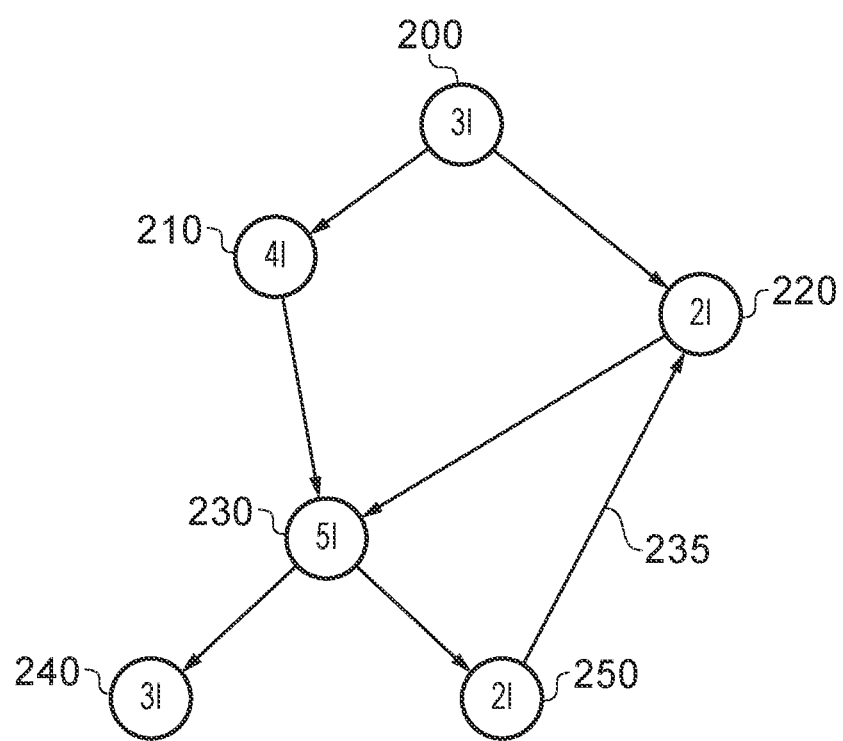
FIGS. 2A-2D illustrate a process of determining a degree of uniqueness of edges in a control flow graph.

FIG. 2A shows the initial control flow graph. The first basic block 200 contains 3 instructions. A control flow instruction then enables control flow to move to a second basic block 210 of four instructions or a third basic block 220 of two instructions. In any event, control flow instructions then cause the control flow to pass to a fourth basic block 230 of five instructions. Finally, another control flow instruction enables flow to pass to a fifth basic block 240 of three instructions or a sixth basic block 250 of two instructions. Of these, the sixth basic block 250 has a loop back to an earlier block of instructions 220, i.e., a reverse cycle. A first step is to remove the reverse cycle in the control flow graph, by which a node 250 returns to a previous node 220. This is achieved by modifying an edge 235 that defines the reverse cycle to target a new virtual node that references the original target (endpoint) 220 of the edge 235.

It will be appreciated that there are now four possible control flow paths in this simple example. Note that, in practice, some of these paths might be impossible. For instance, the path between the first basic block 200 and the third basic block 220 might technically be permitted according to the instructions, but during execution the path will never actually be taken. For instance, if the control flow instruction that links the first basic block 200 to the second basic block 210 and the third basic block 220 essentially states that control flow should pass to the second block 210 if x is greater than 15 but should pass to the third block 220 if x is less than 15 then theoretically, either path can be followed. However, if the final instruction of the first basic block 200 is "x=300" then in practice, the flow to the third basic block 220 will never actually be taken. Such control flow paths may or may not be allowed depending on the mode of operation of the data processing apparatus 110 as will be discussed in more detail below.

Figure 2B:
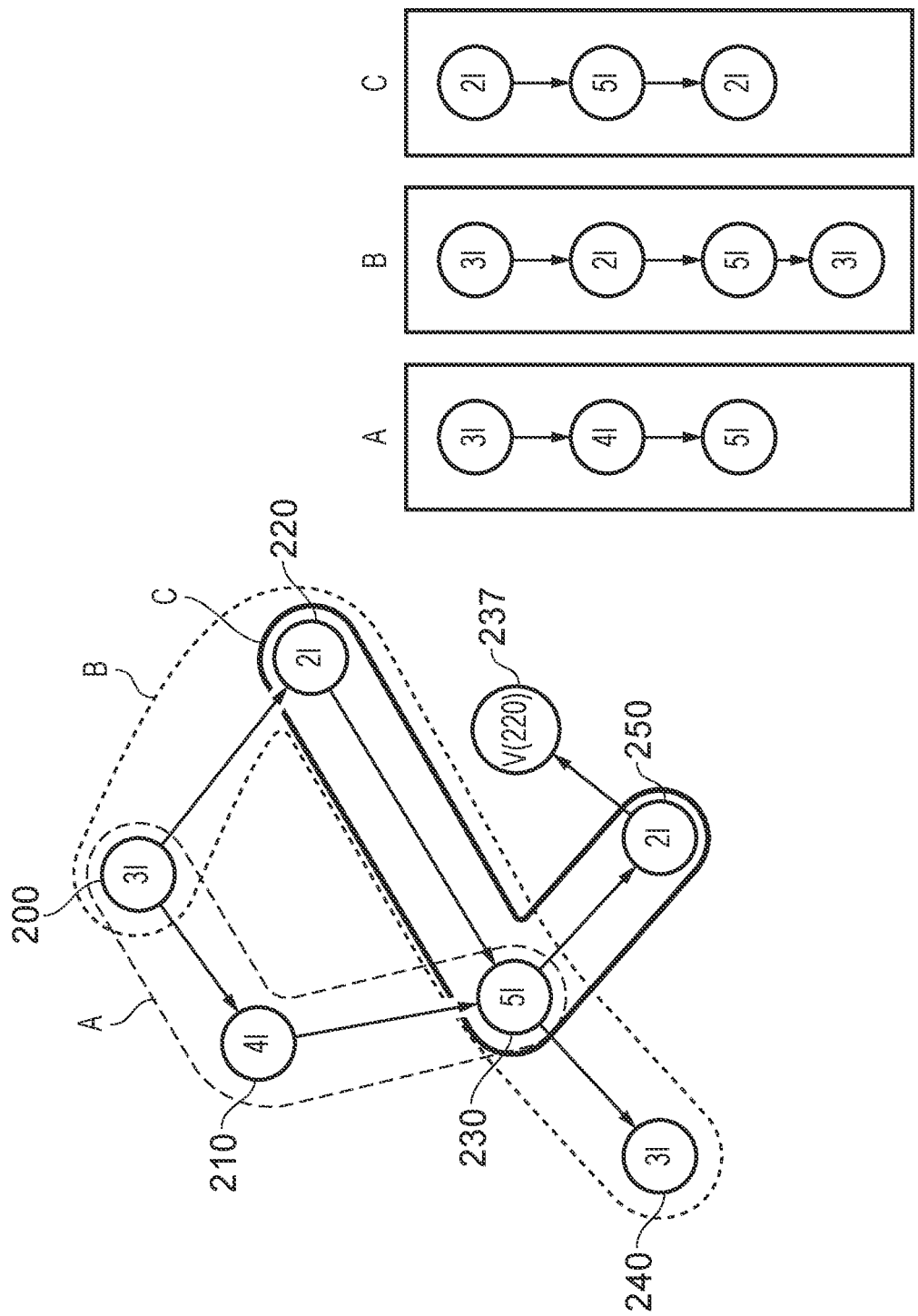

FIG. 2B illustrates the selection of three control flow path fragments on the modified graph that contains the virtual node 237. A control flow path fragment is at least part of a control flow path. The fragments need not start at the top basic block, nor do they need to end at the last basic block. A control flow path fragment could be a control flow path in its entirety, or might only be a subsection of such a path. The control flow path fragments are randomly sampled (e.g. via the technique described in https://math.stackexchange.com/questions/2673132/a-procedure-for-sampling-paths-in-a-directed-acyclic-graph/2676725).

In some embodiments, random sampling of control flow path fragments might be limited to fragments of a particular length. If so, and if the randomly sampled control flow path fragment exceeds this length, then another fragment is randomly sampled. If the randomly sampled control flow path fragment ends with a virtual node (e.g. that was added in order to eliminate a reverse cycle) then the target reference node (that is associated with that virtual node that was added) can be added to the end of the fragment (provided it does not exceed the length limitation). If there are multiple possibilities for the target reference node, one can be picked at random.

Note that in some embodiments, the length limitation is not a hard limit, and a small deviation from this might be permitted e.g. if the randomly sampled control flow path fragment ends with one of the virtual nodes.

Three randomly sampled (control flow) path fragments are illustrated in FIG. 2B—paths A, B, and C.

Figure 2C:
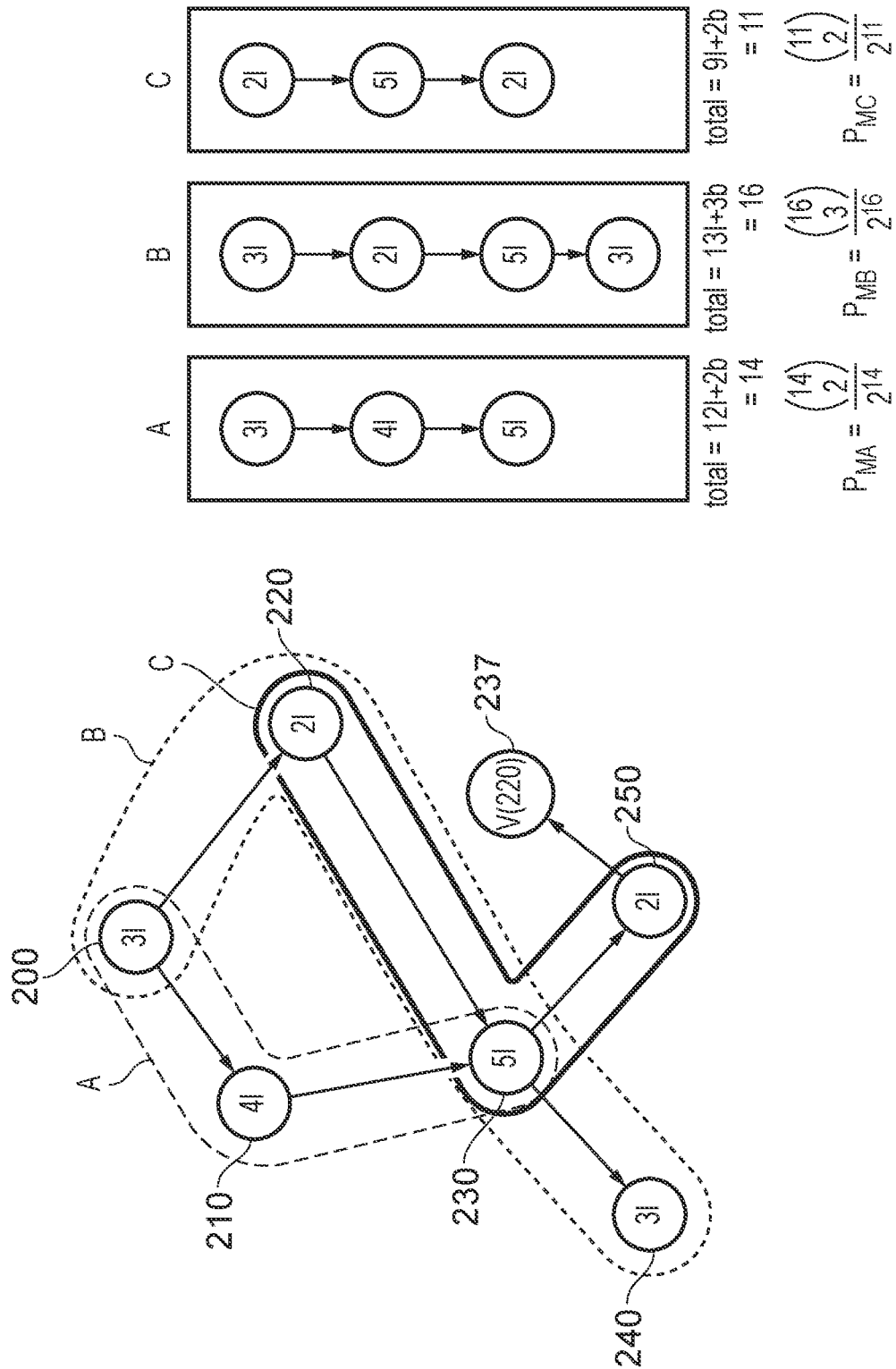

FIG. 2C shows an equation to determine the probability of two control flow path fragments producing the same measurements (i.e. the inverse of uniqueness). This may be expressed as follows:

$$\frac{\text{number of possible path fragments producing the same measurements}}{\text{number of possible path fragments having an equal number of elements}}$$

In this example, two measurements are made: the number of instructions encountered across the basic blocks, and the number of branch instructions encountered. In other embodiments, the number of executed instructions and the number of branch instructions executed could be considered. In other embodiments, additional or alternative measurements could be considered.

The number of possible control flow path fragments producing the same measurements is combinatorial:

$$\binom{n}{b}$$

where n is the number of elements (instructions and branches) in the basic blocks making up a path fragment, and b is the number of branch instructions within the path fragment. So for a fragment containing 18 non-branch instructions and four branch instructions there are:

$$\binom{18+4}{4}$$

different ways of arranging the instructions and branch instructions into a path fragment. Each of those control flow path fragments would produce the same measurements.

Since there are two measurements being taken, the number of possible control flow path fragments is $$2^n$$

which is to say that each of the n elements could be a branch instruction or a different instruction. If there were three measurements being taken, the equation would simply be $3^n$ and so on.

The matching probability of a path fragment X is then:

$$P_{mX} = \frac{\binom{n}{b} - 1}{2^n} \approx \frac{\binom{n}{b}}{2^n}$$

FIG. 2C shows the calculation for the uniqueness of each of control flow path fragments A, B, and C. For path A this is $91/2^{14}$, for path B this is $560/2^{16}$, and for path C this is $55/2^{11}$. In practice, the ordering of uniqueness from lowest to highest is therefore C, B, and A.

The random sampling process can either be performed until each edge appears at least once (assuming that all edges can be reached) or can be performed a fixed number of times.

Each edge is then weighted based on these calculations. There are a number of ways that this can be achieved. However, in this example, it is assumed that each matching probability $P_m$ is independent. The weight of each edge is therefore equal to the sum of matching probabilities of all sampled paths that the edge lies on. Empty edges (if any exist) can simply adopt the probability of their closest neighbouring edge (or from their parent) having a value.

Figure 2D:
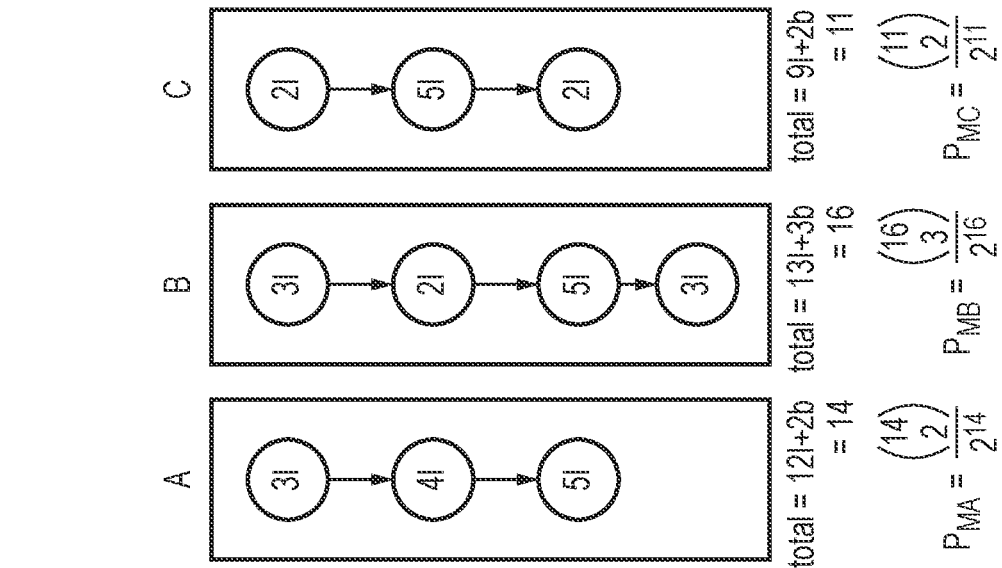
Figure 2D:
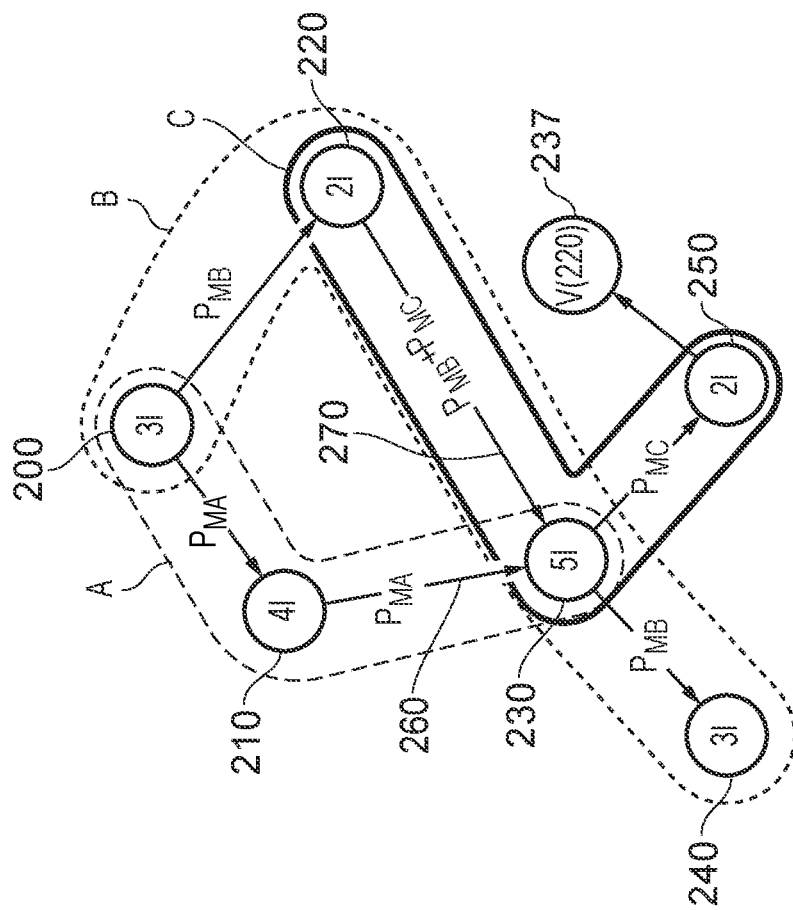

FIG. 2D shows an example of this calculation. For instance, for an edge 260 that only lies on path fragment A, the value of that edge is equal to $P_{mA}$. In contrast, for an edge 270 that lies on both path fragment B and path fragment C, the value of that edge is equal to $P_{mB} + P_{mC}$. The weight of an edge thereby represents a likelihood of that edge being unique to a path fragment.

Note that rather than calculate each fraction, it is possible to consider only the numerators and then perform normalisation of each of the weights by scaling according to the largest denominator.

Having calculated the weighting of each edge, the control flow graph has any reverse cycles reconnected, for example by eliminating virtual node 237 that was initially created and restoring removed edge 235.

Figure 3:
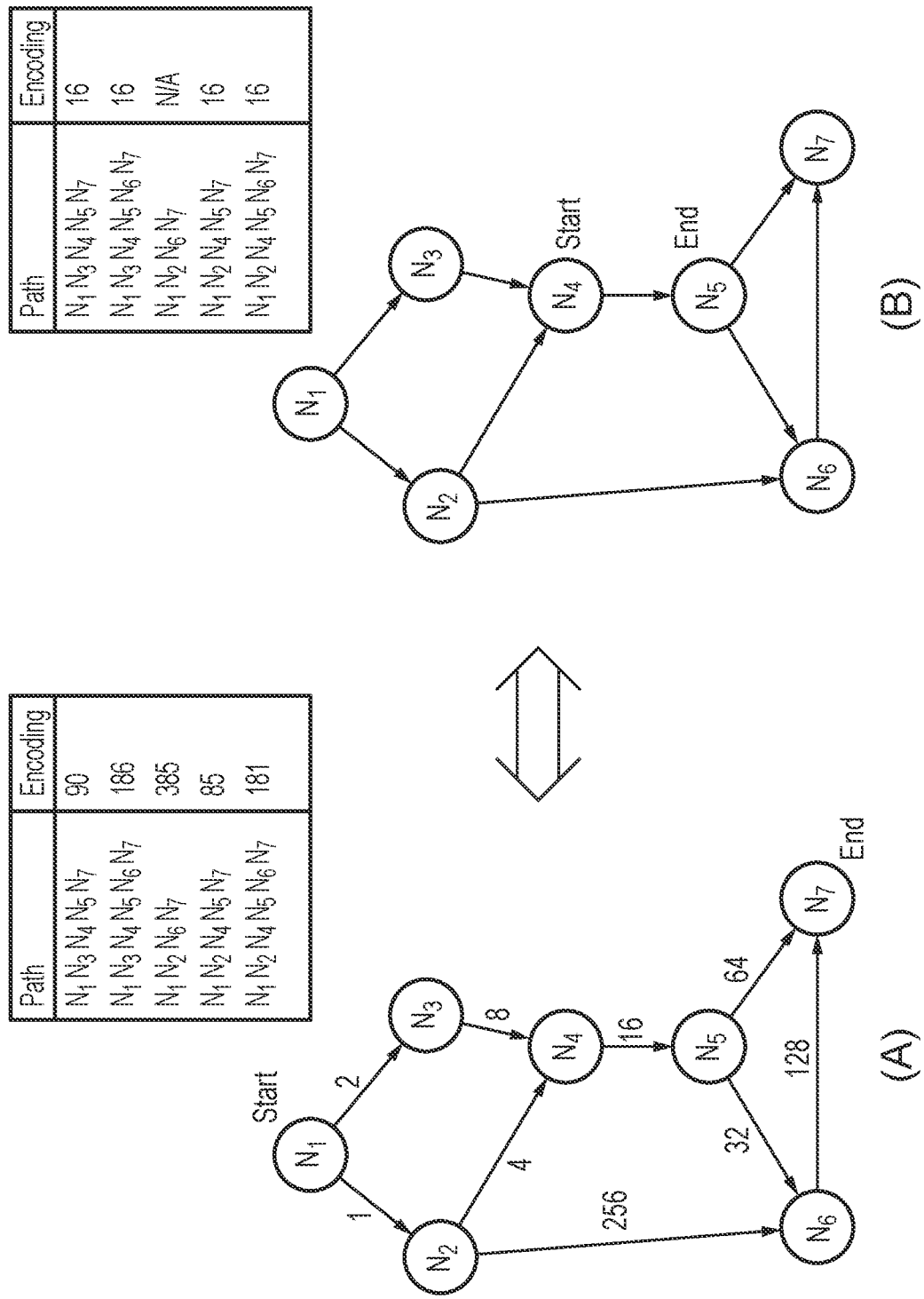
FIG. 3 illustrates a tradeoff in terms of where the instrumentation is to be performed.

The next step is to determine the instrumentation points using the edge weights that have been calculated. The instrumentation points are used to indicate the points at which profiling is performed in the compiled instructions, e.g. by an executing data processing apparatus 120. The determination of the instrumentation points can be achieved using, for instance, the technique described in Ball and Larus in "Efficient Path Profiling" (Proceedings of the 29th annual ACM/IEEE international symposium on Microarchitecture). This technique 'consumes' the edge weights that were calculated in FIGS. 2A-2D in order to determine locations for the instrumentation points to be placed. In addition, edges or basic blocks are assigned values, that can be used to uniquely identify a path taken through the graph. This is different to the weights that were calculated earlier. FIG. 3 shows a simplified example of these values. During profiling, a running total is kept of the values of each edge passed through. By carefully assigning values), it is possible to uniquely identify a control flow path based on the running total that is produced. One way to do this would be to assign each edge a different power of two. However, Ball and Larus also describe another technique that may be more efficient for uniquely identifying paths.

As illustrated in FIG. 3, there is a tradeoff in terms of where the instrumentation points are placed (i.e. where profiling is to start and end). In graph (A), instrumentation points are placed at $N_1$ and $N_7$ such that profiling takes place across the entire program and so it is possible to uniquely identify a path or path fragment—no two control flow paths or control flow path fragments will produce exactly the same total, as shown in the encoding table for each possible control flow path from $N_1$ to $N_7$. However, profiling is generally a resource intensive activity and so profiling across the entirety of a program is undesirable, even though it may allow one to determine the exact control flow path that has been taken. In contrast, in graph (B) (in which edge values for unmeasurable paths have been removed for clarity), instrumentation points are placed at $N_4$ and $N_5$ such that profiling takes place only across one control flow instruction (with edge value '16'). Resource usage is therefore kept low. However, it is almost impossible to determine which control flow path has been taken, because when activated, profiling will produce the same total (16) for every control flow path. Therefore, no encoding is produced for the path $N_1N_2N_6N_7$ since it does not pass along the edge ($N_4$, $N_5$). Meanwhile, the same encoding (16) is produced for each other path from $N_1$ to $N_7$.

More generally, as the extent to which profiling is performed is decreased, the uniqueness of control flow paths also decreases. Recall from the above that the more unique each control flow path is, the easier it becomes to identify attack vectors in programs and the harder it is for a would-be attacker to determine an attack vector that is difficult to discover, since such a vector will stand out.

It is therefore desirable to limit the extent to which profiling is performed, while maintaining as much uniqueness of control flow paths as possible. As previously mentioned, the technique suggested by Ball and Larus in section 3.3 of "Efficient Path Profiling" (Proceedings of the 29th annual ACM/IEEE international symposium on Microarchitecture) can be used to find suitable locations for the instrumentation points. Briefly speaking, the algorithm can be implemented as follows:

Determine a maximum spanning tree of the control flow graph
For each edge 'E' not in the maximum spanning tree:
Add edge E to form a cycle
Sum the edge weights (previously calculated using the matching probabilities $P_m$, e.g. as shown in FIG. 2D) of each edge making up the cycle together to produce a sum S
Assign a value of S to edge E
Mark each edge on the cycle
Remove edge E
Set the edge weight of each marked edge to 0
Re-add all of the edges E not part of the original spanning tree.

In effect, the weights (that were based on matching probabilities) of edges in the maximum spanning tree are thereby 'migrated' to the remaining edges. A highly accurate determination of path (fragment) uniqueness can then be determined by adding instrumentation points so as to cover every edge having a non-zero weight. Edges having the lowest scores are least useful in identifying control flow paths, and those below a particular threshold could be eliminated from the profiling process. Note that there may be multiple sets of instrumentation points—e.g. if the weighted edges are far apart.

Figure 4:
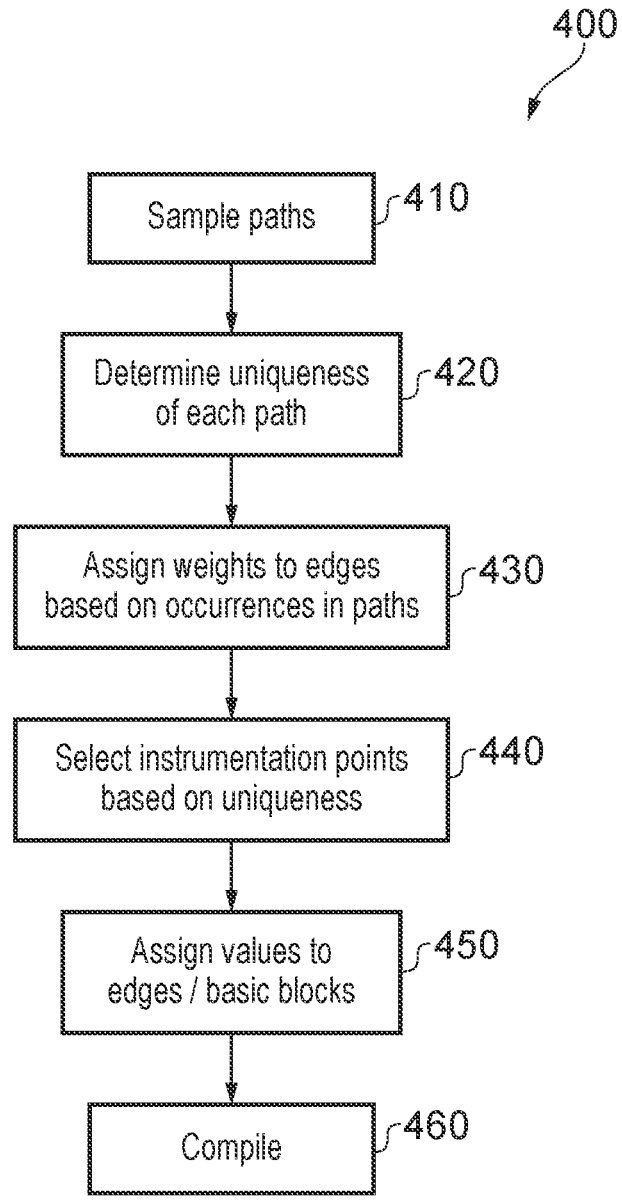
FIG. 4 shows the overall process in the form of a flow chart.

FIG. 4 shows the overall process in the form of a flow chart 400. At a step 410, control flow path fragments are randomly sampled. At a step 420, the uniqueness of each control flow path fragment that has been randomly sampled is calculated, e.g. as shown in FIG. 2C. At a step 430, weights are assigned to edges. The assignment is based on the edge weights that have been calculated in step 420 as well as how often each edge appears in the randomly sampled control flow path fragments. This is shown, for instance, in FIG. 2D. At a step 440, the instrumentation points are selected based on the uniqueness (edge weights) that have been assigned to the edges. This can be achieved using the Ball and Larus technique described above. Once the instrumentation points are determined, these calculated edge weights can be discarded. Then, the original set of instructions can be modified at step 450 so that PMU profiling is performed between the instrumentation points. This can be achieved by adding an edge value to a running total (e.g. in a register). Having modified the instructions in this way, the resulting instructions are then compiled at step 460.

The result is the instrumentation of the original set of instructions. The instrumentation is such that those parts of the control flow graph (i.e. those portions of the program) that are more useful in unambiguously identifying the control flow path being taken are prioritised for profiling using the PMU. Thus, the extent to which profiling is performed can be limited while still performing sufficient profiling to best identify control flow paths being taken. The profiling itself that takes place can include the summed edge values (kept as, for instance, a running total in a register) in order to identify the control path that has been taken. As previously explained, the selection of the instrumentation points is such that the amount of profiling that is performed is kept low, and yet the uniqueness of each control path (as identified by the PMU counts for that running total) is kept high.

As a result of this, the profiling is limited while making it harder for an attacker to find a good attack vector—i.e. a control flow path that allows for an attack, which happens to look like other legitimate control flow paths. Thus, security is improved while reducing resource usage.

The application could be configured in accordance with the following clauses:

1. A data processing apparatus comprising:

storage circuitry configured to store a plurality of instructions, wherein the plurality of instructions are interconnected; and analysis circuitry configured to analyse the plurality of instructions to determine a degree of uniqueness of profile measurements of a plurality of control flow path fragments within the plurality of instructions.

2. The data processing apparatus according to clause 1, wherein
the degree of uniqueness of a given profile measurement is made with respect to a number of ways of producing the given profile measurement from different instruction combinations.

3. The data processing apparatus according to any preceding clause, wherein
the plurality of instructions are divided into a plurality of basic blocks each comprising a contiguous subset of the plurality of instructions; and
the plurality of basic blocks are interconnected using control flow instructions.

4. The data processing apparatus according to clause 3, wherein each of the control flow path fragments is defined by a set of the control flow instructions.

5. The data processing apparatus according to any preceding clause, wherein
the profile measurements are measurements of a performance monitoring unit.

6. The data processing apparatus according to any preceding clause, wherein
the profile measurements comprise one or more of: a number of executed instructions, a number of instructions, a number of control flow instructions taken, and a number of control flow instructions.

7. The data processing apparatus according to any preceding clause, comprising:
compilation circuitry configured to perform a compilation of the plurality of instructions to produce a compiled output, wherein the compiled output comprises instrumentation instructions to cause the profile measurements to be made when executed.

8. The data processing apparatus according to clause 7, wherein
the compilation is a just-in-time compilation.

9. The data processing apparatus according to any preceding clause, wherein
the analysis circuitry is configured to determine a profiling start point and a profiling end point based on the degree of uniqueness of the profile measurements of the plurality of control flow path fragments within the plurality of instructions.

10. The data processing apparatus according to clause 9, wherein
the analysis circuitry is configured to determine the profiling start point and the profiling end point by determining a tradeoff between:
a distance between the profiling start point and the profiling end point, and
the degree of uniqueness of the profile measurements of the plurality of control flow path fragments within the plurality of instructions.

11. The data processing apparatus according to any preceding clause, wherein
the control flow path fragments are selected by random sampling.

12. The data processing apparatus according to any preceding clause, wherein the analysis circuitry has a restricted mode of operation in which at least one of the control flow path fragments cannot be reached by execution of the plurality of instructions; and
the analysis circuitry has a full mode of operation in which the control flow path fragments are selected regardless of whether they can be reached during execution of the instructions.

13. A data processing method comprising:
storing a plurality of instructions, wherein the plurality of instructions are interconnected; and
analysing the plurality of instructions to determine a degree of uniqueness of profile measurements of a plurality of control flow path fragments within the plurality of instructions.

14. A non-transitory storage medium storing a computer program that, when executed:
analyses a plurality of interconnected instructions to determine a degree of uniqueness of profile measurements of a plurality of control flow path fragments within the plurality of interconnected instructions.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A data processing apparatus comprising:
storage circuitry configured to store a plurality of computer program instructions, wherein the plurality of computer program instructions are interconnected;
analysis circuitry configured to analyse the plurality of computer program instructions to determine a degree of uniqueness of profile measurements of a plurality of control flow path fragments within the plurality of computer program instructions, wherein the analysis circuitry is configured to determine a profiling start point and a profiling end point based on:
a distance between the profiling start point and the profiling end point, and
a degree of uniqueness of the profile measurements of the plurality of control flow path fragments within the plurality of computer program instructions,
wherein the distance between the profiling start point and the profiling end point is smaller than a distance of other possible profiling start points and profiling end points, and wherein the degree of uniqueness is greater than a degree of uniqueness of other possible profiling start points and profiling end points; and compilation circuitry configured to perform a compilation of the plurality of computer program instructions to produce a compiled output, wherein the compiled output comprises instrumentation computer program instructions;

executing the compiled instrumentation computer program instruction, to perform profiling between the determined the profiling start point and the profiling end point;

wherein profiling takes measurements of a series of actions between the determined the profiling start point and the profiling end point.

2. The data processing apparatus according to claim 1, wherein
the degree of uniqueness of a given profile measurement is made with respect to a number of ways of producing the given profile measurement from different computer program instruction combinations.

3. The data processing apparatus according to claim 1, wherein
the plurality of instructions are divided into a plurality of basic blocks each comprising a contiguous subset of the plurality of computer program instructions; and
the plurality of basic blocks are interconnected using control flow computer program instructions.

4. The data processing apparatus according to claim 3, wherein
each of the control flow path fragments is defined by a set of the control flow computer program instructions.

5. The data processing apparatus according to claim 1, wherein
the profile measurements are measurements of a performance monitor.

6. The data processing apparatus according to claim 1, wherein
the profile measurements comprise one or more of: a number of executed computer program instructions, a number of computer program instructions, a number of control flow computer program instructions taken, and a number of control flow computer program instructions.

7. The data processing apparatus according to claim 1, wherein
the compilation is a just-in-time compilation.

8. The data processing apparatus according to claim 1, wherein
the control flow path fragments are selectable by random sampling.

9. The data processing apparatus according to claim 1, wherein
the analysis circuitry has a restricted mode of operation in which at least one of the control flow path fragments cannot be reached by execution of the plurality of computer program instructions; and
the analysis circuitry has a full mode of operation in which the control flow path fragments are selected regardless of whether they can be reached during execution of the computer program instructions.

10. A data processing method comprising:
storing, by storage circuitry, a plurality of computer program instructions, wherein the plurality of computer program instructions are interconnected;

analysing, by analysis circuitry, the plurality of computer program instructions to determine a degree of uniqueness of profile measurements of a plurality of control flow path fragments within the plurality of computer program instructions, wherein the analysing comprises determining a profiling start point and a profiling end point based on:
a distance between the profiling start point and the profiling end point, and
a degree of uniqueness of the profile measurements of the plurality of control flow path fragments within the plurality of computer program instructions,
wherein the distance between the profiling start point and the profiling end point is smaller than a distance of other possible profiling start points and profiling end points, and wherein the degree of uniqueness is greater than a degree of uniqueness of other possible profiling start points and profiling end point; and
performing, by compilation circuitry, a compilation of the plurality of computer program instructions to produce a compiled output, wherein the compiled output comprises instrumentation computer program instructions
executing the compiled instrumentation computer program instruction, to perform profiling between the determined the profiling start point and the profiling end point;
wherein profiling takes measurements of a series of actions between the determined the profiling start point and the profiling end point.

11. A non-transitory storage medium storing a computer program that, when executed by one or more data processors, causes the one or more data processors to perform the following steps:
analysing a plurality of interconnected computer program instructions and determining a degree of uniqueness of profile measurements of a plurality of control flow path fragments within the plurality of interconnected computer program instructions;
determining a profiling start point and a profiling end point based on:
a distance between the profiling start point and the profiling end point, and
a degree of uniqueness of the profile measurements of the plurality of control flow path fragments within the plurality of computer program instructions,
wherein the distance between the profiling start point and the profiling end point is smaller than a distance of other possible profiling start points and profiling end points, and wherein the degree of uniqueness is greater than a degree of uniqueness of other possible profiling start points and profiling end point; and
performing a compilation of the plurality of computer program instructions to produce a compiled output, wherein the compiled output comprises instrumentation computer program instructions;
executing the compiled instrumentation computer program instruction, to perform profiling between the determined the profiling start point and the profiling end point;
wherein profiling takes measurements of a series of actions between the determined the profiling start point and the profiling end point.

* * * * *